United States Patent [19]

Wolner

[11] Patent Number: 4,538,702
[45] Date of Patent: Sep. 3, 1985

[54] SHOCK ABSORBER FOR FALL PROTECTION SYSTEM

[75] Inventor: J. Thomas Wolner, Red Wing, Minn.

[73] Assignee: D B Industries, Inc., Red Wing, Minn.

[21] Appl. No.: 477,385

[22] Filed: Mar. 21, 1983

[51] Int. Cl.³ .................. A62B 35/00; B60R 21/10
[52] U.S. Cl. ..................................... 182/3; 182/230
[58] Field of Search ................. 188/65.1; 182/3, 4, 182/5, 6, 7, 230; 297/472, 471, 470; 5/409, 410, 408

[56] References Cited

U.S. PATENT DOCUMENTS

| 272,259 | 2/1883 | Howland | 182/5 |
| 2,303,954 | 12/1942 | Roke | 182/3 |
| 3,444,957 | 5/1969 | Ervin | 182/3 |

FOREIGN PATENT DOCUMENTS

| 2460163 | 12/1974 | Fed. Rep. of Germany | 297/472 |
| 407838 | of 0000 | United Kingdom. | |
| 1105648 | 3/1968 | United Kingdom. | |
| 1341528 | 12/1973 | United Kingdom. | |

Primary Examiner—Reinaldo P. Machado
Attorney, Agent, or Firm—Williamson, Bains, Moore & Hansen

[57] ABSTRACT

A shock absorber as designed for use in fall protection systems and may be incorporated integrally with either a belt or lanyard or may be used as a separate component in conjunction with conventional belts and lanyards. A shock absorbing mechanism of the invention utilizes a piercing member having smooth edges which pierce a piece of webbing material. When force is applied to opposite ends of the shock absorber, the piercing member stretches and breaks latitudinal fibers of the webbing material. This allows near complete retention of the strength of the longitudinal fibers as those fibers are not damaged during the absorbing operation.

3 Claims, 10 Drawing Figures

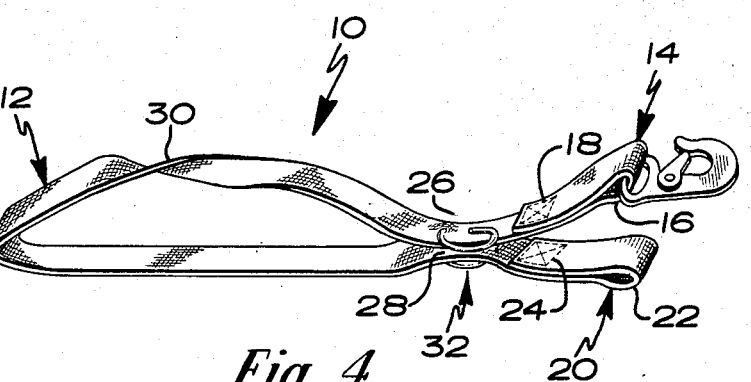
Fig 4
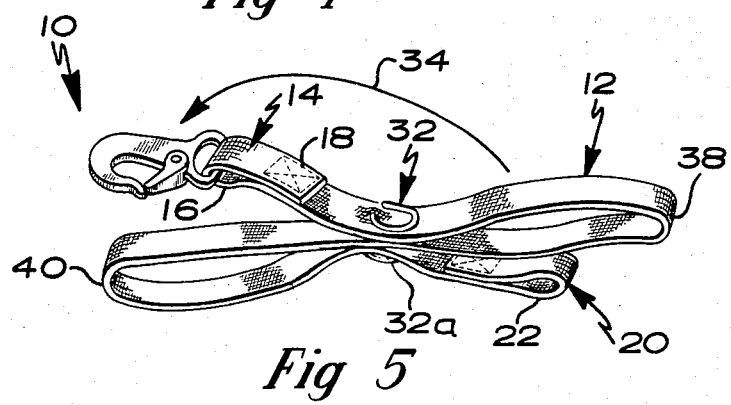
Fig 5
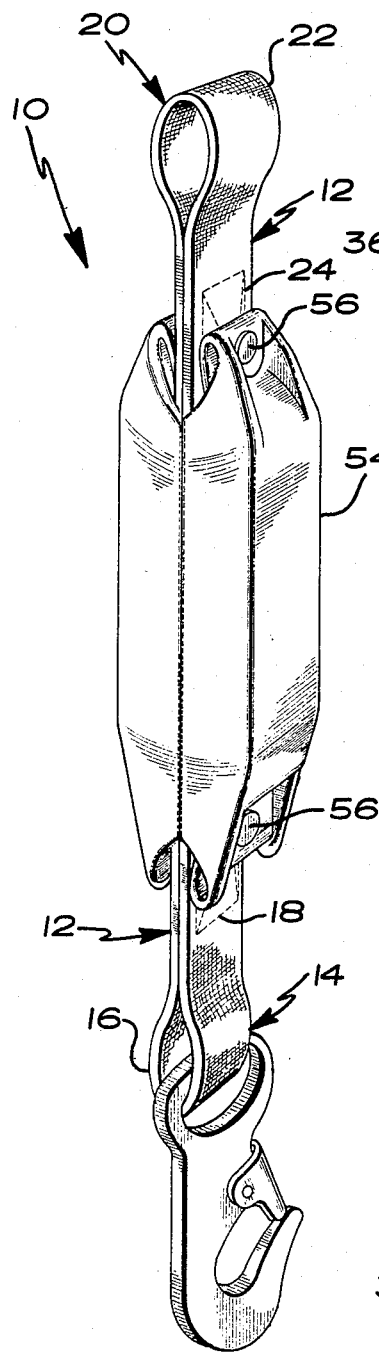
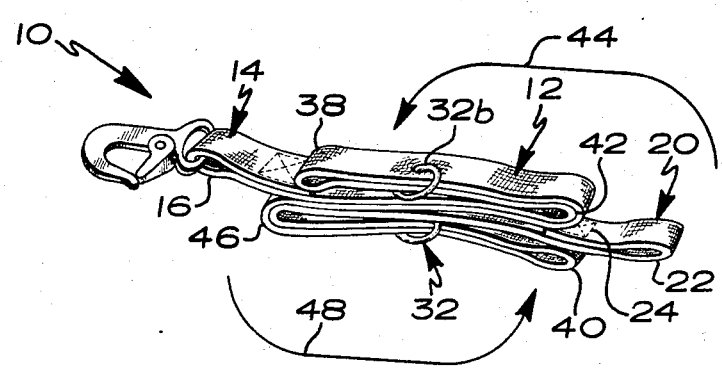
Fig 6
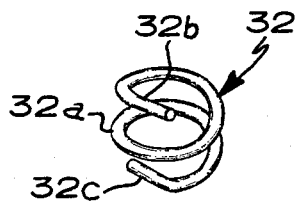
Fig 3
Fig 1
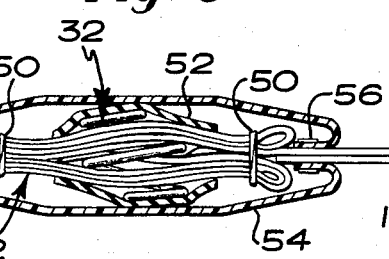
Fig 2

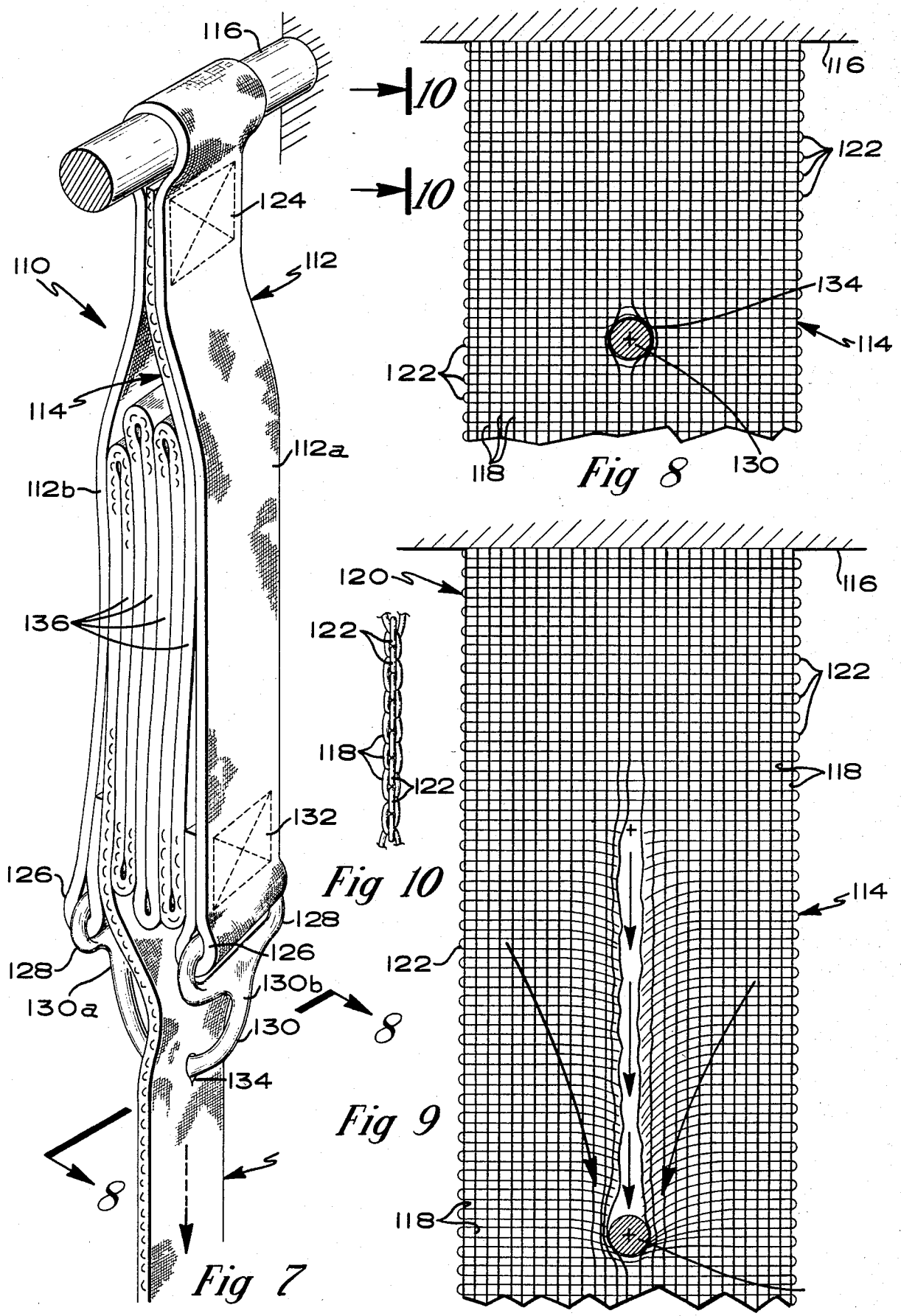

SHOCK ABSORBER FOR FALL PROTECTION SYSTEM

BACKGROUND OF THE INVENTION

Shock absorbers for use by workers in a fall protection systems are, in general, old and well known. Some examples of such prior systems are shown in U.S. Pat. Nos. 3,762,507, 2,724,463 and 2,796,953. Other shock absorbing devices for use in straps have been shown in devices for use with motor vehicle seat belts and with parachute harnesses. Such examples are shown in U.S. Pat. Nos. 3,277,855, 4,027,905, 3,973,650, 3,897,106, 3,550,957, 3,547,387 and 2,474,124. Several of these prior art devices, including the last mentioned above, utilize breakable stitching holding together more than one layer of webbing to absorb shock. None of these devices, however, utilizes the mechanism of the instant invention, which will be more fully described hereinafter.

SUMMARY OF THE INVENTION

The shock absorber of the instant invention is designed to absorb the kinetic energy generated by a falling worker by breaking the latitudinal fibers (or picks) of the piece of webbing material while leaving the longitudinal fibers intact in order to retain the strength therein.

A coiled piercing member pierces a single piece of webbing material adjacent the first and second ends thereof. The rest of the belt is then folded up so as to form a compact unit which may be readily used at any time. Thus, the length of the material between the point where the coil piercing member pierces it is available for breakage of the picks therein. The coiled piercing member may elongate or otherwise deform during activation thereby provides an additional mechanism for energy absorption.

In an alternate embodiment, a first member is formed having an anchoring or attachment mechanism at one end and a U-shaped piercing member at the other end. The piercing member, as mentioned, is generally U-shaped and has a generally circular and smooth-edged cross section so that the absorption mechanism results from stretching and breaking of the fibers rather than cutting. The choice of this shock absorption mechanism, while utilizes the stretching and breaking rather than cutting, yields a particularly consistent shock absorbing device in which the degree and the amount of shock absorption can be accurately and consistently determined by means of varying webbing construction dimensions and the material therein and the dimensions of the piercing member. The mechanism also allows the opportunity to provide a device which may be manufactured using only one simple part which is not common to those normally used in a fall protection system.

These and other objects and advantages of my invention will appear more fully from the following description made in conjunction with the accompanying drawings wherein like reference characters refer to the same or similar parts throughout the several views.

DESCRIPTION OF THE DRAWING FIGURE

FIG. 1 is a perspective view of the shock absorber of the instant invention;

FIG. 2 is a side plan view of the shock absorber with the cover partially cut away;

FIG. 3 is a perspective view of the piercing coil.

FIG. 4 is a perspective view showing the first step in assembly of the invention.

FIG. 5 is a perspective view showing the next step in assembly;

FIG. 6 is yet another perspective view showing the final assembly step;

FIG. 7 is a perspective view of the shock absorbing device;

FIG. 8 is a sectional view taken along line 8—8 of FIG. 7;

FIG. 9 is a view similar to FIG. 8 showing a shcok absorber after use; and

FIG. 10 is a sectional view taken along line 10—10 of FIG. 8.

DESCRIPTION OF THE PREFERRED EMBODIMENT

The instant invention, generally 10, is shown in various stages of assembly in FIGS. 4–6. In particular, shock absorber 10 is formed in the preferred embodiment by utilizing a single piece of webbing 12 having a first end 14 and a second end 20. First end 14 has a loop therein for attachment purposes and is secured by stitching 18. Second end 20 also has a loop 22 for attachment purposes and is also secured by corresponding stitching 24. Adjacent first and second ends 14 and 20 are first and second initial piercing zones 26 and 28. Before initial piercing, as can be seen in FIG. 4, first end 14 is folded over so as to overly second end 20 with a half twist 30 being placed in webbing 12 as it is folded. Piercing member 32 is shown in detail in FIG. 3 and is generally coil shaped having a piercing portion 32a and first and second ends 32b and 32c, respectively.

After the folding has taken place, piercing member 32 is inserted through piercing areas 26 and 28 so that piercing portion 32a passes through the layers of webbing and first end 32b of piercing member 32 overlies area 26 and second end 32c overlies piercing area 28.

In the next step, first end 14 is rotated approximately 180° in the direction of arrow 34. Thence, approximately the central portion 36 of web 12 is tucked between piercing areas 26 and 28. This yields the configuration shown in FIG. 5 which yields additional end loops 38 and 40 as shown therein.

Thence, loop 38 is folded at fold 42 in the direction shown by arrow 44 in FIG. 6. Correspondingly, loop 40 is folded at fold 46 in the direction shown by arrow 48.

In order to provide a finished product, FIG. 2 shows rubber bands being used to secure the loops with a rubber strap 52 enclosing and protecting coil piercing member 32. Lastly, a light cover 54 encompasses the whole mechanism and is secured to the webbing by means of rivots 56.

In an alternate embodiment, the instant invention, generally 110, is comprised of a first member 112 and a second member 114. In general, first member 112 may be attached to an anchor 116 while second member 114 may be attached to a body belt or harness (not shown). It can also be appreciated that the anchoring points for the first and second members, 112 and 114 respectively, may be reversed.

It should further be recognized for both embodiments that shock absorbers 10 and 110 may be incorporated into a number of different assemblies for fall protection in addition, of course, to other uses. In particular, it is contemplated that shock absorbers 10 or 110 may be manufactured integrally with a body belt/harness. Alternatively, shock absorbers 10 or 110 may be utilized between a conventional body belt/harness and an attachment lanyard of the conventional sort. Further, shock absorbers 10 or 110 may be manufactured integrally with a safety lanyard for attachment to an anchor, and these various embodiments are all contemplated within the instant invention.

The fiber webbing for both embodiments is of a construction which is shown in FIGS. 8 through 10 and in detail in FIG. 10. The longitudinal fibers or warps 118 run the length of webbing 120, while the latitudinal fibers or picks 122 run across the webbing 120. Such fiber webbing is in general well known, and is available in a wide variety of embodiments of both the webbing itself and the particular fibers therein as well as selection or materials. Ideally, a synthetic material is utilized for this purpose. The material and piercing member should be such that normal working pressure will not cause any breakage. Ideally, a dynamic force of around 400 pounds is desired to start the breakage process.

Second member 114 is attached to first member 112 at a point of attachment 124, which is shown in FIG. 7, by stitching in a conventional cross pattern. In the embodiment of the instant invention, first member 112 is looped about an anchor 116 which may also be a clip or other conventional attachment means and terminates at either end in attachment loops 126 which pass through loops 128 by piercing member 130 and are fastened back upon themselves by means of stitching 132. As can be seen in FIG. 7, piercing member 130 has first and second ends 130a and 130b which have attachment loops 128 thereon for attachment to first member 112. Piercing member 130 is generally smooth edged in nature, as shown by the circular cross section in FIGS. 8 and 9. Piercing member 130 initially pierces second member 114 at a piercing point 134. As can be seen particularly in FIG. 7, the length of the second member 114 between attachment point 124 and piercing point 134 is substantially greater than the linear distance between these two points. This is accomplished by means of folds 136 in second member 114. In this embodiment, folds 136 are located between legs 112a and 112b of first member 112. The use of folds 136 allows deceleration to take place over a longer distance, thereby decreasing the decelerative force on the worker while at the same time allowing a compact device until it is needed.

FIG. 9 in particular shows the mechanism by which shock is absorbed in that it shows the breaking of the picks 122 by piercing member 130 while allowing the warps 118 to remain essentially intact, thereby retaining most of the longitudinal strength of the fiber in second member 114.

It is appreciated, of course, that there are several variations which may be incorporated in the instant invention to modify or alter the dynamic performance characteristics of the shock absorber of the instant invention. In particular, it is contemplated that some of the picks may be pre-broken or cut as part of the manufacturing or assembly procedure. It is also contemplated that cross stitching may be added parallel to the picks so as to increase the number of picks per inch for a given fiber webbing. Characteristics may yet be further modified by combining sections or layers of webbing having difference weave characteristics, the most important being the number of picks per inch. Lastly, cross or longitudinal stitching of the folded layer 116 may be used to combine a rip-stitch energy absorption mechanism with the pick breakage mechanism. It is yet further contemplated that the shock absorber of the instant invention will be enclosed in a bundle so that upon any significant shock absorption, the bundle will be ruptured thereby serving to graphically signal that the shock absorber has been used, as well as protecting the mechanism from exposure to snagging and the like.

While the preferred embodiments of the present invention have been described, it should be understood that various changes, adaptions and modifications may be made therein without departing from the spirit of the invention and the scope of the appended claims.

What is claimed is:

1. A shock absorber for fall protection systems, said shock absorber comprising:
    at least one piece of webbing having first and second ends and longitudinal and latitudinal fibers;
    attachment means at said first and second ends; and
    a smooth-edged piercing member initially piercing said webbing at first and second piercing points adjacent said first and second ends, respectively, the linear distance long the entire length of said webbing being greater than the distance between said first and second piercing points.

2. The shock absorber of claim 1 wherein said piercing member comprises a coil.

3. The shock absorber of claim 2 wherein said piercing member coil has first and second ends and wherein at least one portion of said webbing folded under one of said coil ends.

* * * * *